(12) United States Patent
Tseng et al.

(10) Patent No.: US 10,720,834 B2
(45) Date of Patent: Jul. 21, 2020

(54) CHARGE PUMP APPLIED TO ORGANIC LIGHT-EMITTING DIODE DISPLAY PANE

(71) Applicant: Raydium Semiconductor Corporation, Hsinchu (TW)

(72) Inventors: Pei-Kai Tseng, Keelung (TW); Chen-Pin Lo, New Taipei (TW); Shen-Xiang Lin, Taipei (TW); Chih-Jen Hung, Taipei (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 0 days.

(21) Appl. No.: 16/387,762

(22) Filed: Apr. 18, 2019

(65) Prior Publication Data

US 2019/0334435 A1    Oct. 31, 2019

Related U.S. Application Data

(60) Provisional application No. 62/664,381, filed on Apr. 30, 2018.

(51) Int. Cl.
*G05F 1/10* (2006.01)
*H02M 3/07* (2006.01)
*G09G 3/3208* (2016.01)

(52) U.S. Cl.
CPC .......... *H02M 3/073* (2013.01); *G09G 3/3208* (2013.01); *G09G 2310/0264* (2013.01); *H02M 2003/077* (2013.01)

(58) Field of Classification Search
CPC ............ H02M 3/073; H02M 2003/077; G09G 3/3208; G09G 2310/0264; G09G 2330/028
USPC .......................................................... 327/536
See application file for complete search history.

(56) References Cited

U.S. PATENT DOCUMENTS

2018/0226017 A1* 8/2018 Chen ........................ H02M 3/07
2019/0044437 A1* 2/2019 Tseng ....................... H02M 3/07

* cited by examiner

*Primary Examiner* — Ryan Jager

(57) ABSTRACT

A charge pump, applied to an OLED display panel and coupled to an output capacitor, includes a first switch to a tenth switch and a first capacitor to a third capacitor. The first switch and second switch are coupled in series between a first voltage and a second voltage lower than first voltage. The third switch is coupled to second voltage. The sixth switch is coupled to first voltage. The seventh switch is coupled to second voltage. The fourth switch, eighth switch and tenth switch are coupled to output capacitor. The first capacitor is coupled between first switch and second switch. The second capacitor is coupled between fifth switch and sixth switch. The third capacitor is coupled between seventh switch and eighth switch. The charge pump is operated in a first phase, a second-A phase, the first phase and a second-B phase in order to provide negative output voltage.

8 Claims, 14 Drawing Sheets

CHARGE PUMP APPLIED TO ORGANIC LIGHT-EMITTING DIODE DISPLAY PANE

BACKGROUND OF THE INVENTION

1. Field of the Invention

The invention relates to a display panel; in particular, to a charge pump applied to an organic light-emitting diode (OLED) display panel.

2. Description of the Prior Art

A source driver of a conventional OLED display panel (e.g., an AMOLED display panel) usually has a built-in charge pump. The charge pump is a DC-DC converter utilizing a capacitor as an energy storage component, mostly used to generate an output voltage greater than the input voltage or to generate a negative output voltage.

Figure 1:
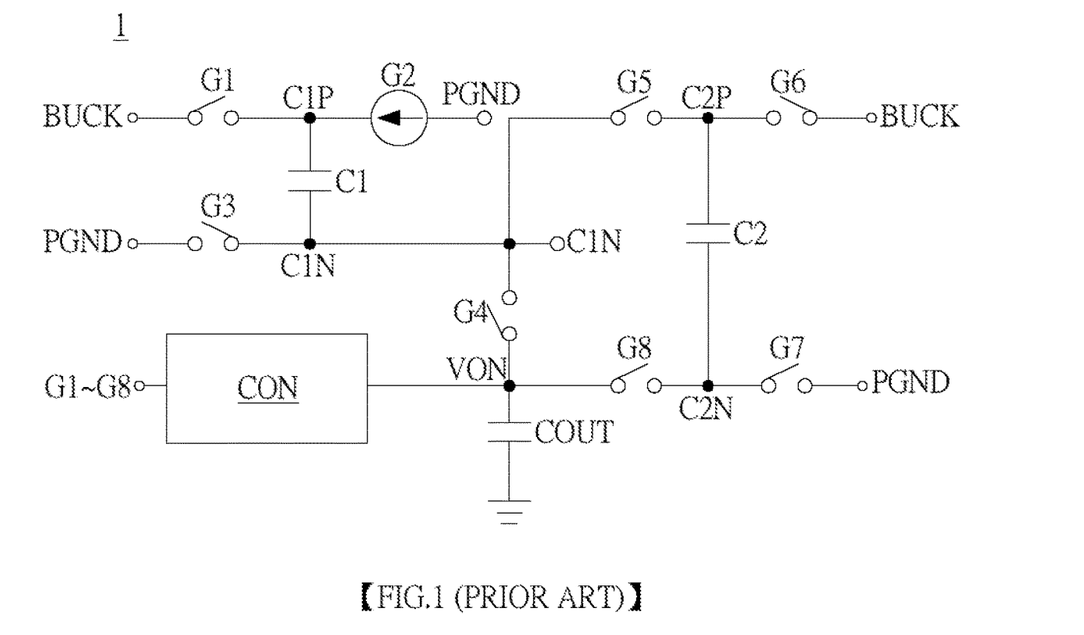
FIG. 1 illustrates a schematic circuit diagram of a conventional charge pump.
Figure 2A:
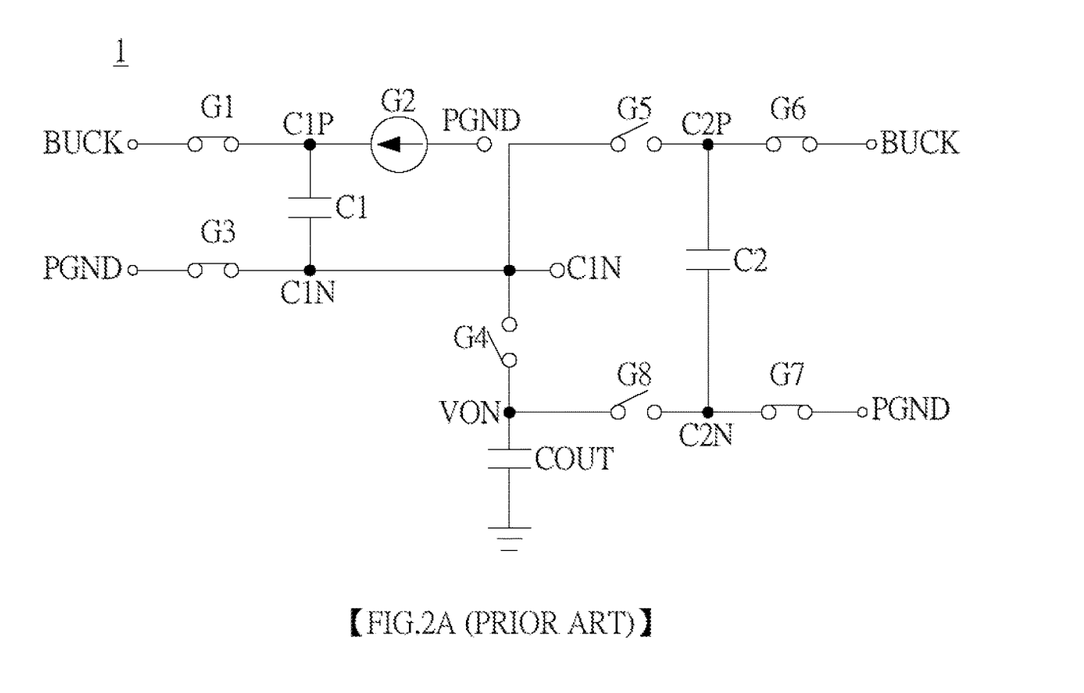
FIG. 2A to 2C illustrate circuit diagrams showing a conventional charge pump operating in a charging state, a −1× charge transferring state and a −2× charge transferring state respectively.
Figure 2B:
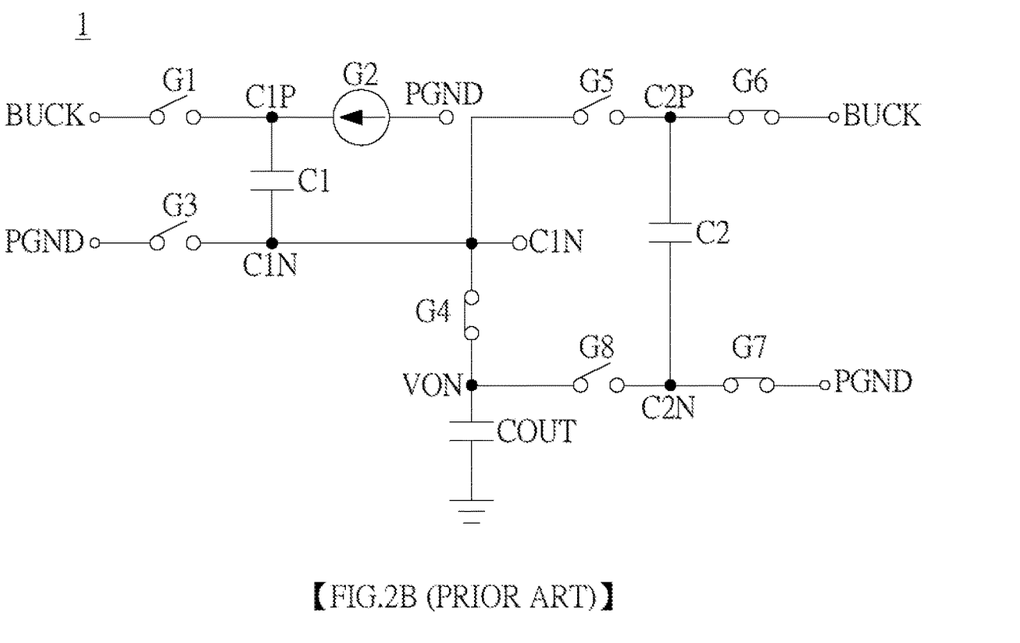
Figure 2C:
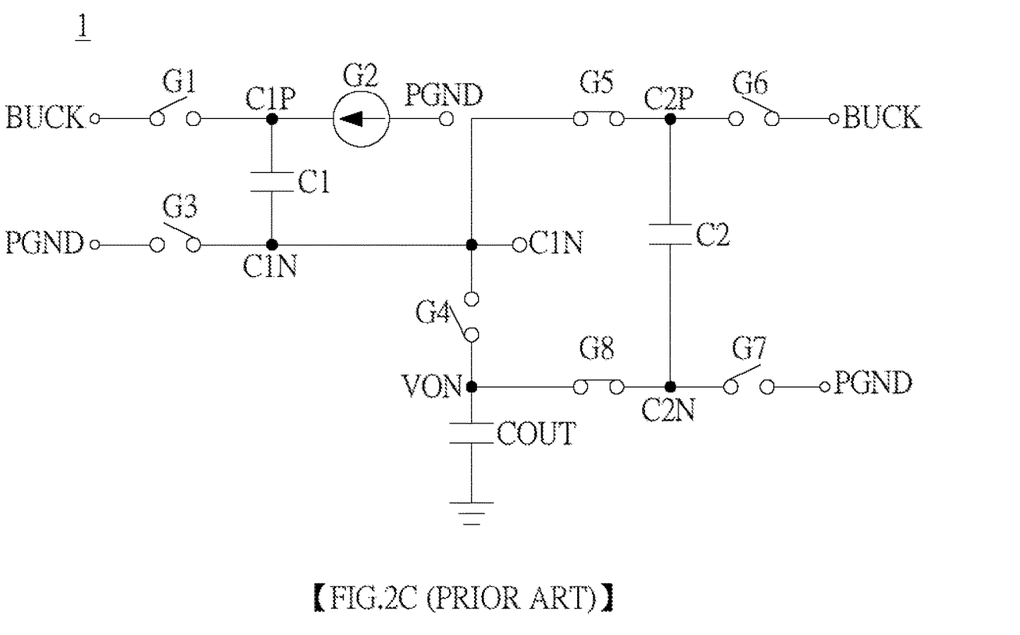

Please refer to FIG. 1 and FIG. 2A to FIG. 2C. FIG. 1 illustrates a schematic circuit diagram of a conventional charge pump 1. FIG. 2A to FIG. 2C illustrate schematic diagrams showing the operation of the conventional charge pump 1 in a charging state, a −1× transferring state and a −2× transferring state respectively. The conventional charge pump 1 can provide a negative output voltage through the above-mentioned charging state, −1× charge transferring state and −2× charge transferring state.

Figure 3A:
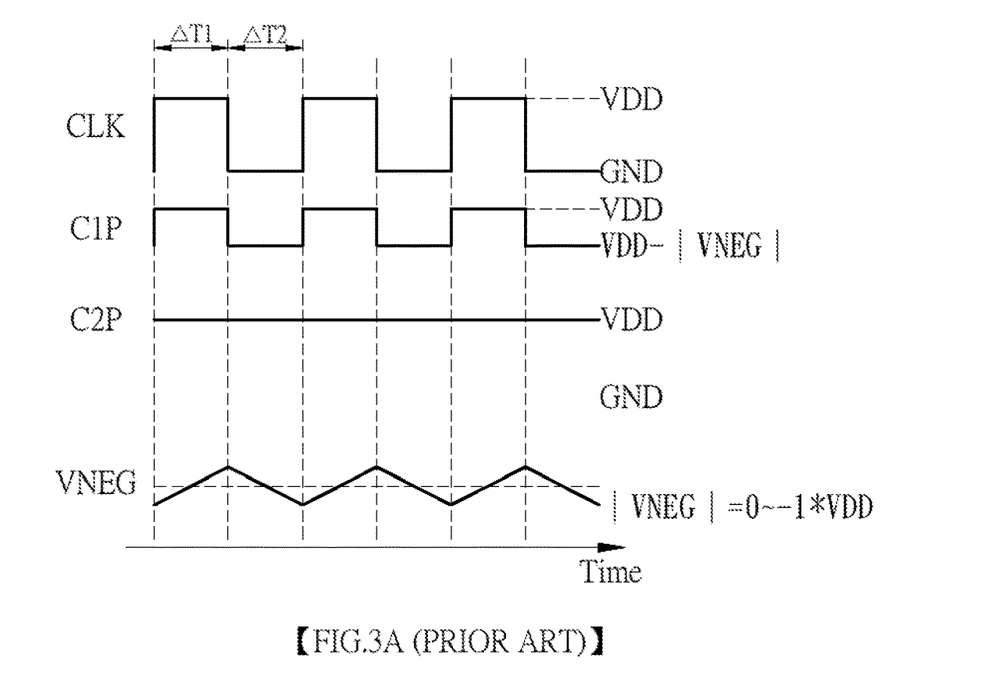
FIG. 3A illustrates a timing diagram of a conventional charge pump operating in a charging state and a −1× charge transferring state.
Figure 3B:
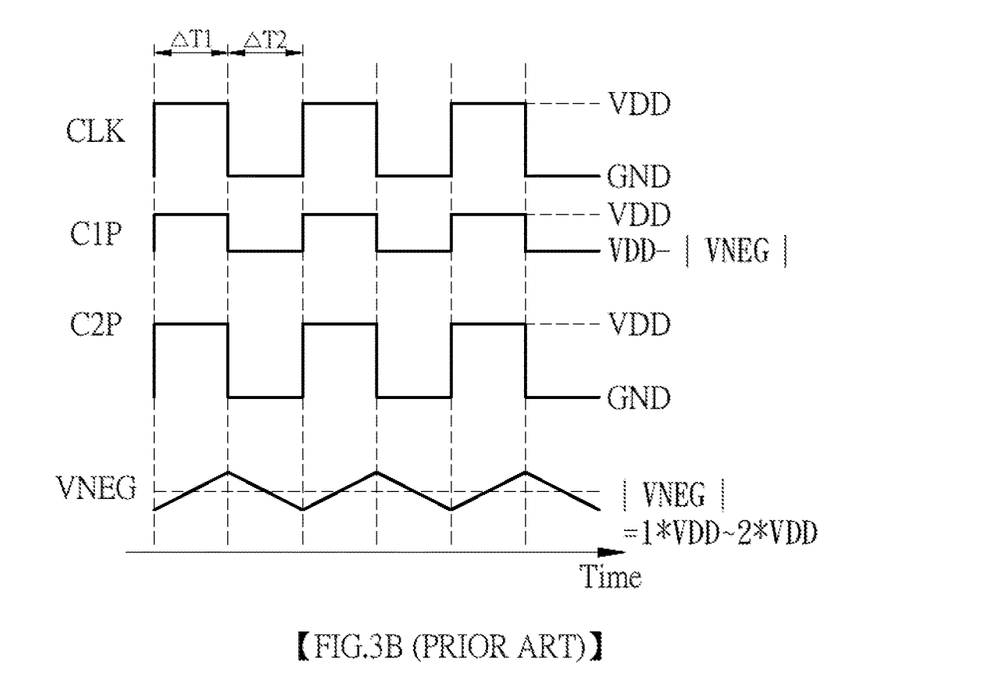
FIG. 3B illustrates a timing diagram showing the conventional charge pump 1 operating in a charging state and a −2× charge transferring state.

Please refer to FIG. 3A and FIG. 3B. FIG. 3A illustrates a timing diagram showing the conventional charge pump 1 operating in the charging state and the −1× charge transferring state. In FIG. 3A, the absolute value of the negative voltage VNEG generated by the conventional charge pump 1 is between 0 and the operating voltage VDD, that is, |VNEG|=0~1*VDD. FIG. 3B illustrates a timing diagram showing the conventional charge pump 1 operating in the charging state and the −2× charge transferring state. In FIG. 3B, the absolute value of the negative voltage VNEG generated by the conventional charge pump 1 is between the operating voltage VDD and 2 times the operating voltage 2 VDD, that is, |VNEG|=1*VDD~2*VDD.

Figure 4:
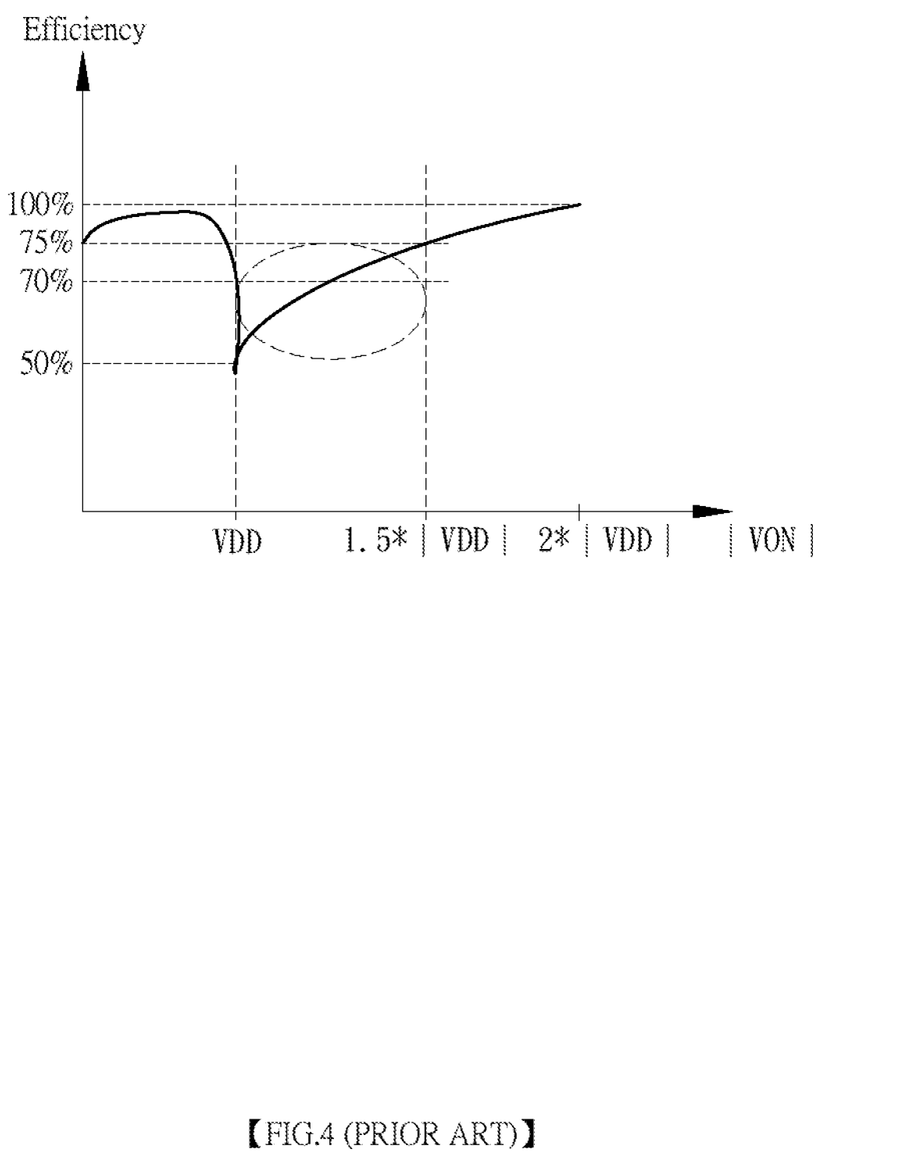
FIG. 4 illustrates a schematic diagram showing the worse the charge transferring efficiency of a conventional charge pump when the absolute value of the output voltage is closer to the operating voltage.

However, as shown in FIG. 4, when the absolute value |VON| of the output voltage (VON) is closer to the operating voltage VDD, the charge transferring efficiency of the conventional charge pump 1 is worse, even as low as 50%. It should be improved as soon as possible.

SUMMARY OF THE INVENTION

Therefore, the invention provides a charge pump applied to an OLED display panel to solve the above-mentioned problems of the prior arts.

A preferred embodiment of the invention is a charge pump. In this embodiment, the charge pump is applied to an OLED display panel and coupled to an output capacitor. The charge pump includes a plurality of switches and a plurality of capacitors. The plurality of switches includes a first switch, a second switch, a third switch, a fourth switch, a fifth switch, a sixth switch, a seventh switch, an eighth switch, a ninth switch and a tenth switch. The plurality of capacitors includes a first capacitor, a second capacitor and a third capacitor.

The first switch and the second switch are coupled in series between a first voltage and a second voltage, and the first voltage is higher than the second voltage; a first terminal of the first capacitor is located between the first switch and the second switch; the third switch is coupled between a second terminal of the first capacitor and the second voltage; the fourth switch is coupled between the second terminal of the first capacitor and the output capacitor; the fifth switch and the sixth switch are coupled in series between the second terminal of the first capacitor and the first voltage; the seventh switch and the eighth switch are coupled in series between the second voltage and the output voltage; a first terminal of the second capacitor is located between the fifth switch and the sixth switch; the ninth switch is coupled between the second terminal of the first capacitor and a second terminal of the second capacitor; the tenth switch is coupled between the second terminal of the second capacitor and the output voltage; a first terminal of the third capacitor is coupled to the second terminal of the second capacitor; a second terminal of the third capacitor is coupled between the seventh switch and the eighth switch; the charge pump is operated in a first phase, a second-A phase, the first phase and a second-B phase in order to provide the output voltage which is negative.

In an embodiment, the first phase is a charging state, the second-A phase is a first charge transferring state and the second-B phase is a second charge transferring state.

In an embodiment, when the charge pump is operated in the first phase, the first switch, the third switch, the sixth switch and the seventh switch are turned on and the second switch, the fourth switch, the fifth switch, the eighth switch, the ninth switch and the tenth switch are turned off, so that the first capacitor is charged by the first voltage and the second capacitor and the third capacitor coupled in series are also charged by the first voltage.

In an embodiment, when the charge pump is operated in the second-A phase, the second switch, the fifth switch and the tenth switch are turned on and the first switch, the third switch, the fourth switch, the sixth switch, the seventh switch, the eighth switch and the ninth switch are turned off, so that the first capacitor and the second capacitor are coupled in series between a ground terminal and the output capacitor to generate the output voltage which is negative.

In an embodiment, an absolute value of the output voltage is equal to a voltage of the first capacitor plus a voltage of the second capacitor.

In an embodiment, when the charge pump is operated in the second-B phase, the second switch, the eighth switch and the ninth switch are turned on and the first switch, the third switch, the fourth switch, the fifth switch, the sixth switch, the seventh switch and the tenth switch are turned off, so that the first capacitor and the third capacitor are coupled in series between a ground terminal and the output capacitor to generate the output voltage which is negative.

In an embodiment, an absolute value of the output voltage is equal to a voltage of the first capacitor plus a voltage of the third capacitor.

In an embodiment, the charge pump further includes a control circuit. The control circuit is coupled to the plurality of switches respectively and used for controlling operation of the plurality of switches according to a timing signal to operate the charge pump in the first phase, the second-A phase and the second-B phase.

In an embodiment, the control circuit also provides an enable signal to a specific switch of the plurality of switches to regulate the negative output voltage within a range of −1 to −2 times.

In an embodiment, the charge pump further includes a first resistor, a second resistor and a comparator. The first resistor and a second resistor are coupled between a reference voltage and the output voltage. The comparator has a first input terminal, a second input terminal and an output terminal, wherein the first input terminal is coupled to a node between the first input terminal and the second input terminal and receives a divided voltage related to the output voltage, the second input terminal receives a ground voltage and the output terminal is coupled to the specific switch.

In an embodiment, the specific switch is the second switch, and the second switch is coupled to a current source disposed between the first switch and the second voltage.

In an embodiment, the specific switch is the first switch, and the first switch is coupled to a current source disposed between the first voltage and the second switch.

In an embodiment, the specific switch is the sixth switch, and the sixth switch is coupled to a current source disposed between the fifth switch and the first voltage.

Compared to the prior art, the charge pump applied to the OLED display panel of the invention can select an optimal charge pump switching way according to a negative output voltage of −1 times/−1.5 times/−2 times, thereby the charge transferring efficiency within negative output voltage of −1 to −2 times can be effectively improved.

The advantage and spirit of the invention may be understood by the following detailed descriptions together with the appended drawings.

DETAILED DESCRIPTION OF THE INVENTION

A preferred embodiment of the invention is a charge pump. In this embodiment, the charge pump can be applied to the source driver of the OLED display panel (e.g., an AMOLED display panel) to receive the input voltage and provide an output voltage to the output capacitor, but not limited to this.

Figure 5:
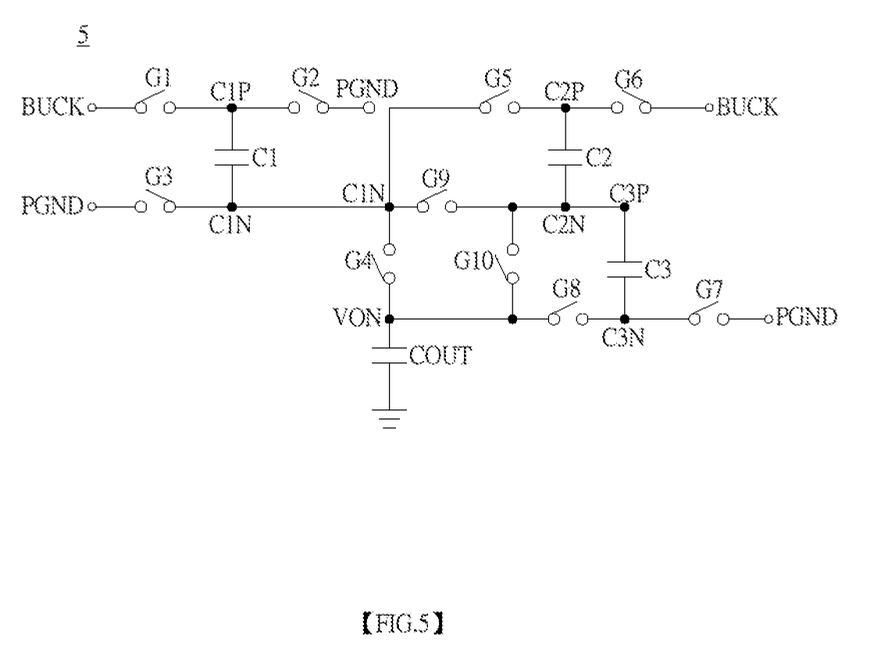
FIG. 5 illustrates a circuit diagram of a charge pump in accordance with an embodiment of the invention.

Please refer to FIG. 5. FIG. 5 is a circuit schematic diagram of the charge pump in this embodiment.

As shown in FIG. 5, the charge pump 5 in this embodiment is coupled to the output capacitor COUT and the charge pump 5 includes 10 switches G1~G10 and three capacitors C1~C3, which include a first switch G1, a second switch G2, a third switch G3, a fourth switch G4, a fifth switch G5, a sixth switch G6, a seventh switch G7, an eighth switch G8, a ninth switch G9, a tenth switch G10, a first capacitor C1, a second capacitor C2 and a third capacitor C3.

In this embodiment, it is assumed that the first capacitor C1, the second capacitor C2 and the third capacitor C3 are 1 uF, and the output capacitor COUT is 3 uF, but not limited to this.

The first switch G1 and the second switch G2 are coupled in series between the first voltage BUCK and the second voltage PGND. The first terminal C1P of the first capacitor C1 is located between the first switch G1 and the second switch G2. The third switch G3 is coupled between the second terminal C1N of the first capacitor C1 and the second voltage PGND. The fourth switch G4 is coupled between the second terminal C1N of the first capacitor C1 and the output voltage VON. The output capacitor COUT is coupled between the output voltage VON and the ground terminal. The fifth switch G5 and the sixth switch G6 are couple in series between the second terminal C1N of the first capacitor C1 and the first voltage BUCK. The seventh switch G7 and the eighth switch G8 are coupled in series between the second voltage PGND and the output voltage VON. The first terminal C1P of the second capacitor C2 is located between the fifth switch G5 and the sixth switch G6. The ninth switch G9 is coupled between the second terminal C1N of the first capacitor C1 and the second terminal C2N of the second capacitor C2. The tenth switch G10 is coupled between the second terminal C2N of the second capacitor C2 and the output voltage VON. The first terminal C3P of the third capacitor C3 is coupled to the second terminal C2N of the second capacitor C2. The second terminal C3N of the third capacitor C3 is located between the seventh switch G7 and the eighth switch G8. The first voltage BUCK is higher than the second voltage PGND.

It should be noted that, in this embodiment, the charge pump 5 can be sequentially operated in the first phase (the charging state), the second-A phase (the first charge transferring state), the first phase (the charging state) and the second-B phase (the second charge transferring state) to implement a charge pump architecture capable of providing a −1 times/−1.5 times/−2 times negative voltage output.

Figures 6A, 6B:
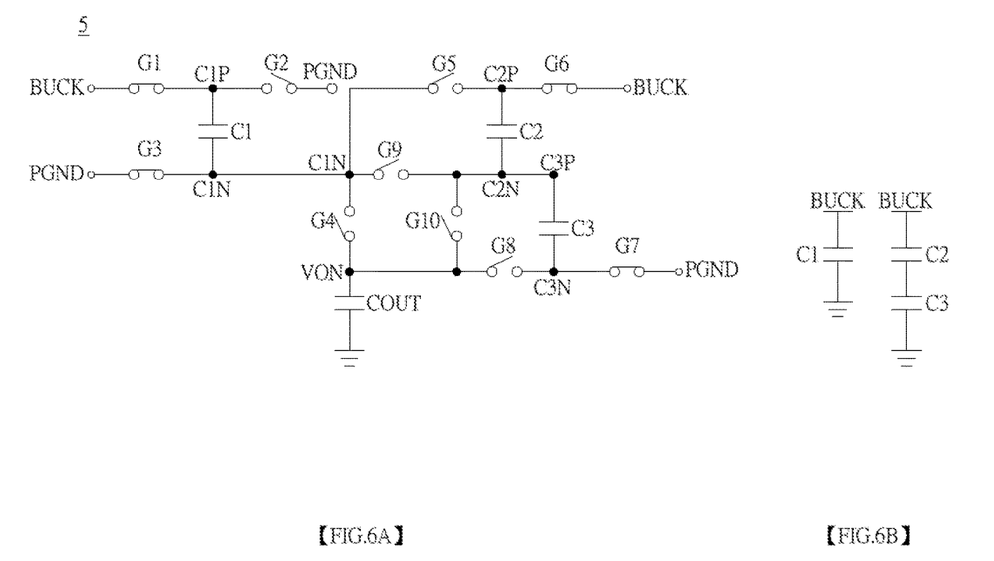
FIG. 6A illustrates a circuit schematic diagram of a charge pump operating in the first phase (the charging state).
FIG. 6B illustrates a schematic diagram showing a coupling relationship between a first capacitor, a second capacitor and a third capacitor in the charge pump operating in the first phase (the charging state).

Next, please refer to FIG. 6A and FIG. 6B. FIG. 6A illustrates a circuit schematic diagram of a charge pump operating in the first phase (the charging state). FIG. 6B illustrates a schematic diagram showing a coupling relationship between a first capacitor, a second capacitor and a third capacitor in the charge pump operating in the first phase (the charging state).

As shown in FIG. 6A and FIG. 6B, when the charge pump 5 operates in the first phase (the charging state), the first switch G1, the third switch G3, the sixth switch G6 and the seventh switch G7 are turned on, and the second switch G2, the fourth switch G4, the fifth switch G5, the eighth switch G8, the ninth switch G9 and the tenth switch G10 are turned off, so that the first capacitor C1 can be charged by the first voltage BUCK to store charges into the first capacitor C1, and the serially coupled second capacitor C2 and third capacitor C3 can be also charged by the first voltage BUCK to store charges into the second capacitor C2 and the third capacitor C3.

In addition, when the charge pump 5 operates in the first phase (the charging state), since the fourth switch G4, the eighth switch G8 and the tenth switch G10 coupled to the output capacitor COUT are turned off, the charges stored in the first capacitor C1, the second capacitor C2 and the third capacitor C3 fail to flow to the output capacitor COUT through the fourth switch G4, the eighth switch G8 and the tenth switch G10.

Figures 7A, 7B:
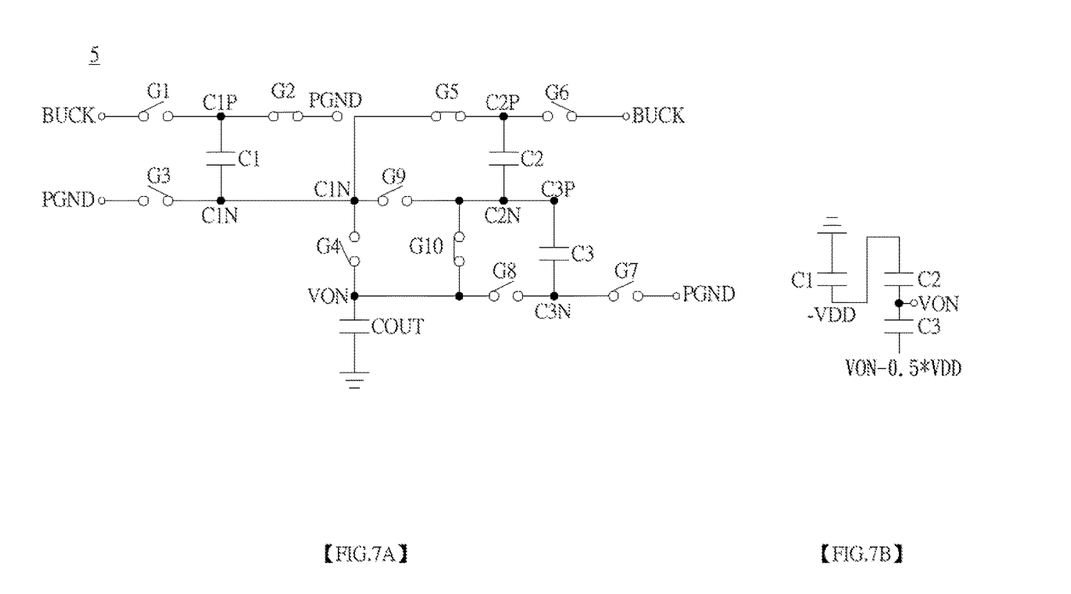
FIG. 7A illustrates a circuit schematic diagram of a charge pump operating in the second-A phase (the first charge transferring state).
FIG. 7B illustrates a schematic diagram showing a coupling relationship between a first capacitor, a second capacitor and a third capacitor in the charge pump operating in the second-A phase (the first charge transferring state).

Please refer to FIG. 7A and FIG. 7B. FIG. 7A illustrates a circuit schematic diagram of a charge pump operating in the second-A phase (the first charge transferring state). FIG. 7B illustrates a schematic diagram showing a coupling relationship between a first capacitor, a second capacitor and a third capacitor in the charge pump operating in the second-A phase (the first charge transferring state).

As shown in FIG. 7A and FIG. 7B, when the charge pump 5 operates in the second-A phase (the first charge transferring state), the second switch G2, the fifth switch G5 and the tenth switch G10 are turned on, and the first switch G1, the third switch G3, the fourth switch G4, the sixth switch G6, the seventh switch G7, the eighth switch G8 and the ninth switch G9 are turned off, so that the first capacitor C1, the second capacitor C2 and the third capacitor C3 are not charged by the first voltage BUCK.

When the charge pump 5 is operated in the second-A phase (the first charge transferring state), the first capacitor C1, the second capacitor C2 and the third capacitor C3 are coupled in series with each other, wherein the first capacitor C1 is coupled between the ground terminal and the negative operating voltage −VDD; the second capacitor C2 is coupled between the negative operating voltage −VDD and the output voltage VON; the third capacitor C3 is coupled between the output voltage VON and (the output voltage VON minus the operating voltage VDD).

That is to say, when the charge pump 5 operates in the second-A phase (the first charge transferring state), the first capacitor C1 and the second capacitor C2 are coupled in series between the ground terminal and the output capacitor COUT to generate a negative output voltage VON. At this time, the absolute value |VON| of the negative output voltage VON will be equal to the voltage value V(C1) of the first capacitor C1 plus the voltage value V(C2) of the second capacitor C2, namely |VON|=V(C1)+V(C2).

Figure 8A:
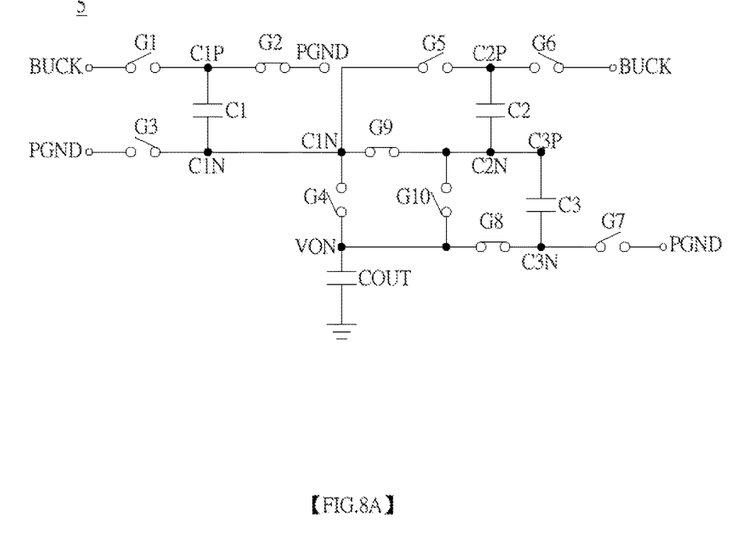
FIG. 8A illustrates a circuit schematic diagram of a charge pump operating in the second-B phase (the second charge transferring state).
Figure 8B:
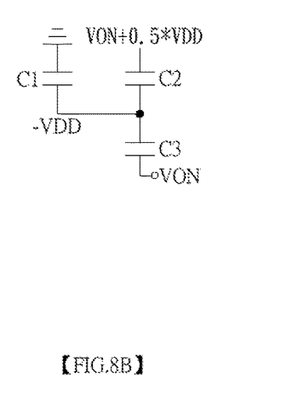
FIG. 8B illustrates a schematic diagram showing a coupling relationship between a first capacitor, a second capacitor and a third capacitor in a charge pump operating in a second-B phase (the second charge transferring state).

Please refer to FIG. 8A and FIG. 8B. FIG. 8A illustrates a circuit schematic diagram of a charge pump operating in the second-B phase (the second charge transferring state). FIG. 8B illustrates a schematic diagram showing a coupling relationship between a first capacitor, a second capacitor and a third capacitor in a charge pump operating in a second-B phase (the second charge transferring state).

As shown in FIG. 8A and FIG. 8B, when the charge pump 5 operates in the second-B phase (the second charge transferring state), the second switch G2, the eighth switch G8 and the ninth switch G9 are turned on, and the first switch G1, the third switch G3, the fourth switch G4, the fifth switch G5, the sixth switch G6, the seventh switch G7 and the tenth switch G10 are turned off, so that the first capacitor C1, the second capacitor C2 and the third capacitor C3 are not charged by the first voltage BUCK.

When the charge pump 5 operates in the second-B phase (the second charge transferring state), the second capacitor C2 and the third capacitor C3 are coupled in series, and the first capacitor C1 is coupled between the second capacitor C2 and the third capacitor C3. The first capacitor C1 is coupled between the ground terminal and the negative operating voltage −VDD; the second capacitor C2 is coupled between (the output voltage VON plus the operating voltage VDD) and the negative operating voltage −VDD; the third capacitor C3 is coupled between the negative operating voltage −VDD and the output voltage VON.

That is to say, when the charge pump 5 operates in the second-B phase (the second charge transferring state), the first capacitor C1 and the third capacitor C3 are coupled in series between the ground terminal and the output capacitor COUT to generate a negative output voltage VON. At this time, the absolute value |VON| of the negative output voltage VON will be equal to the voltage value V(C1) of the first capacitor C1 plus the voltage value V(C3) of the third capacitor C3, namely |VON|=V(C1)+V(C3).

Figure 9:
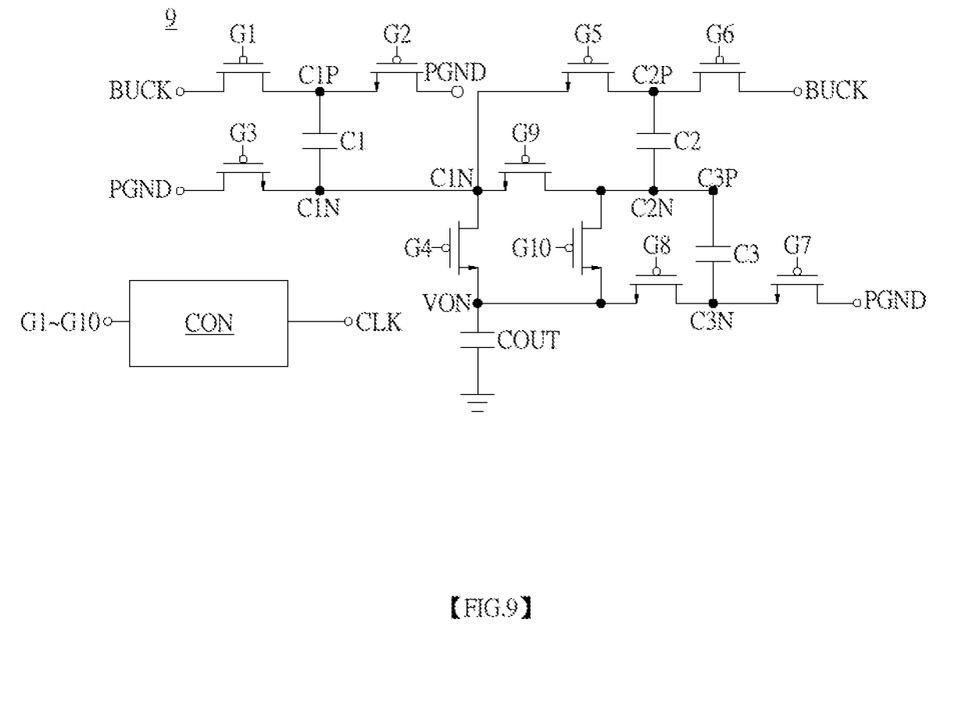
FIG. 9 to FIG. 13 illustrate circuit diagrams showing a charge pump in accordance with various embodiments of the invention.

In another embodiment, as shown in FIG. 9, the first switch G1 to the tenth switch G10 of the charge pump 9 can be transistors, and the operation of the switch G1 to the tenth switch G10 can be controlled by the control circuit CON through the clock signal CLK, but not limited to this.

Figure 10:
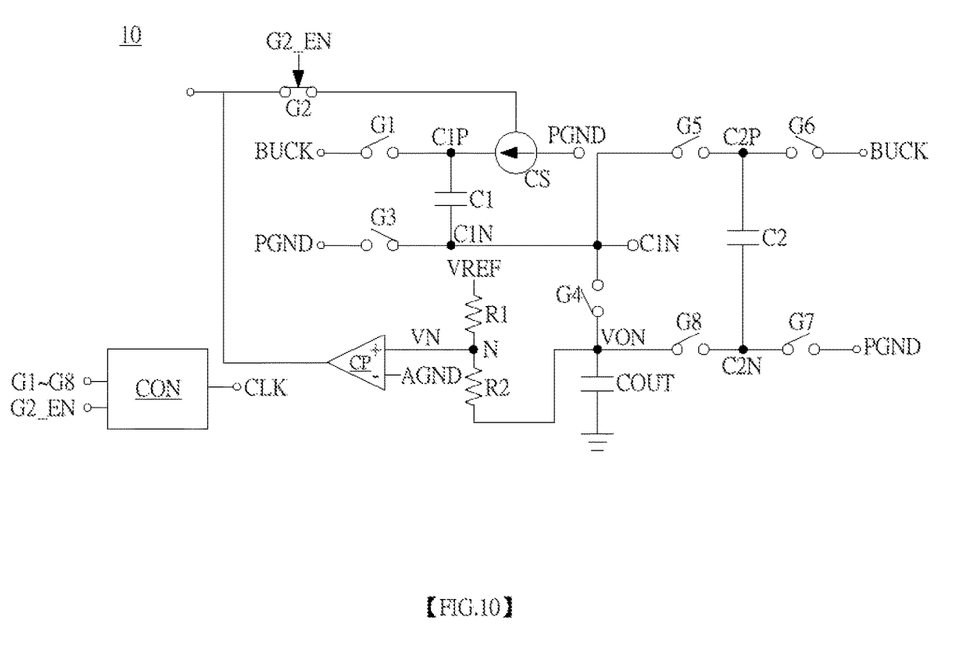

In another embodiment, as shown in FIG. 10, the first resistor R1 and the second resistor R2 are coupled in series between the reference voltage VREF and the output voltage VON, and the positive input terminal+ of the comparator CP is coupled to the node N between the first resistor R1 and the second resistor R2 and receives the divided voltage VN related to the output voltage VON. The negative input terminal− of the comparator CP receives the ground voltage AGND and the output terminal of the comparator CP is coupled to the second switch G2. The second switch G2 is coupled to the current source CS disposed between the first switch G1 and the second voltage PGND.

It should be noted that the charge pump 10 can control the operation of the first switch G1 to the eighth switch G8 according to the clock signal CLK through the control circuit CON, and can also output the enable signal G2_EN to the second switch G2 through the control circuit CON to achieve the effect of regulating the negative output voltage VON within a range of −1 to −2 times by adjusting the voltage or current of the second switch G2.

Figure 11:
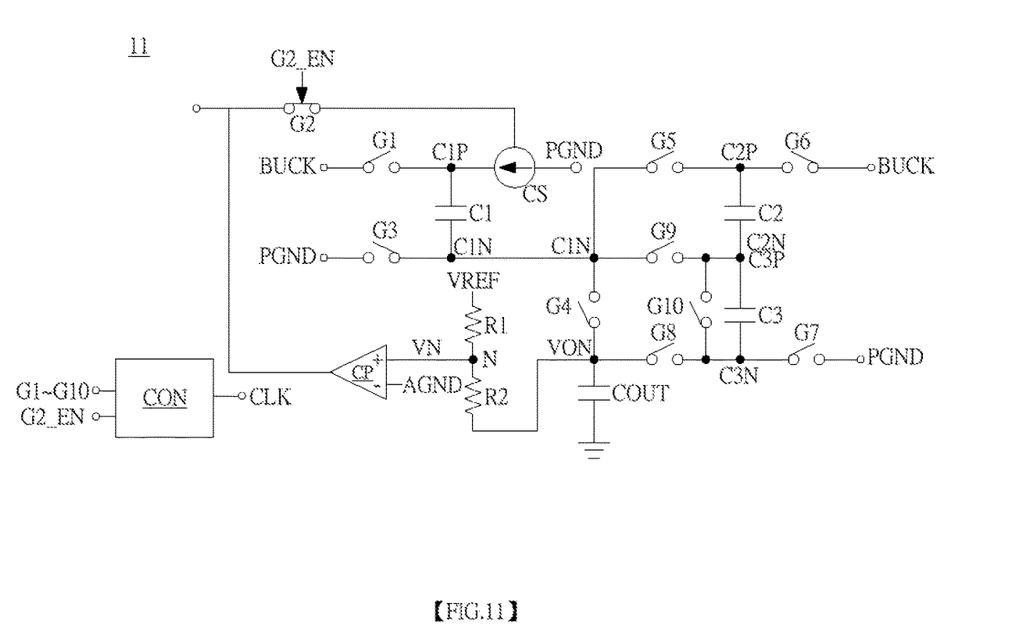

Similarly, in another embodiment, as shown in FIG. 11, the charge pump 11 can not only control the operation of the first switch G1 to the tenth switch G10 according to the clock signal CLK through the control circuit CON, but also output the output signal G2_EN to the second switch G2 through the control circuit CON to achieve the effect of regulating the negative output voltage VON within a range of −1 to −2 times by adjusting the voltage or current of the second switch G2.

Figure 12:
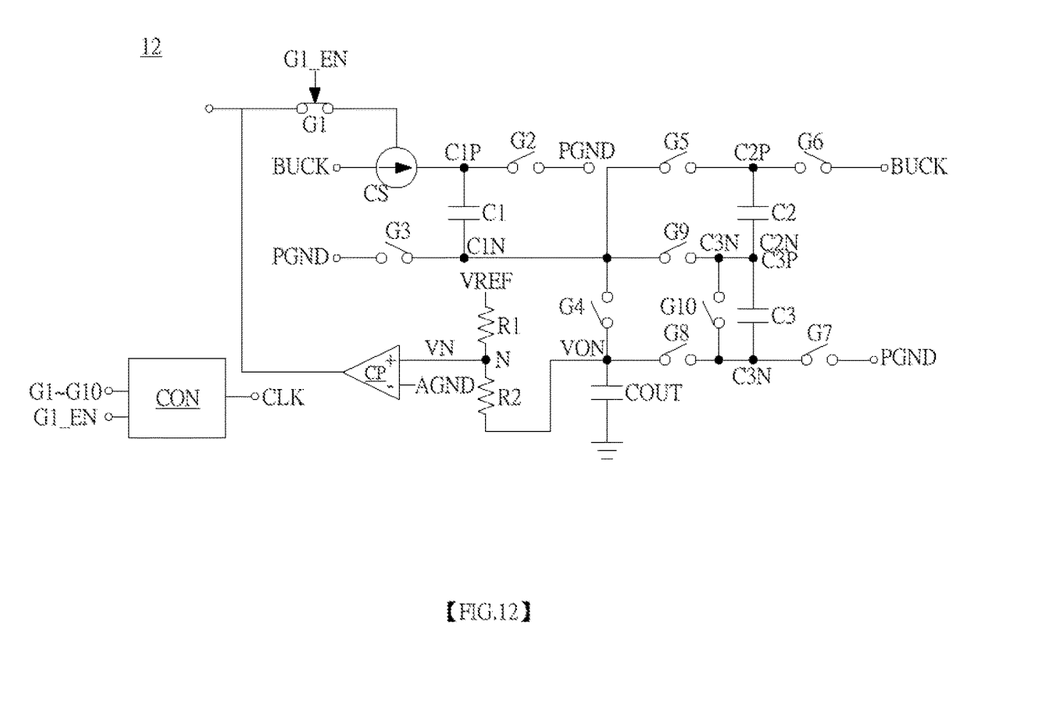

In another embodiment, as shown in FIG. 12, the output terminal of the comparator CP is coupled to the first switch G1, and the first switch G1 is coupled to the current source CS between the first voltage BUCK and the second switch G2. The charge pump 12 can not only control the operation of the first switch G1 to the tenth switch G10 according to the clock signal CLK through the control circuit CON, but also output the enable signal G1_EN to the first switch G1 through the control circuit CON to achieve the effect of regulating the negative output voltage VON within a range of −1 to −2 times by adjusting the voltage or current of the first switch G1.

Figure 13:
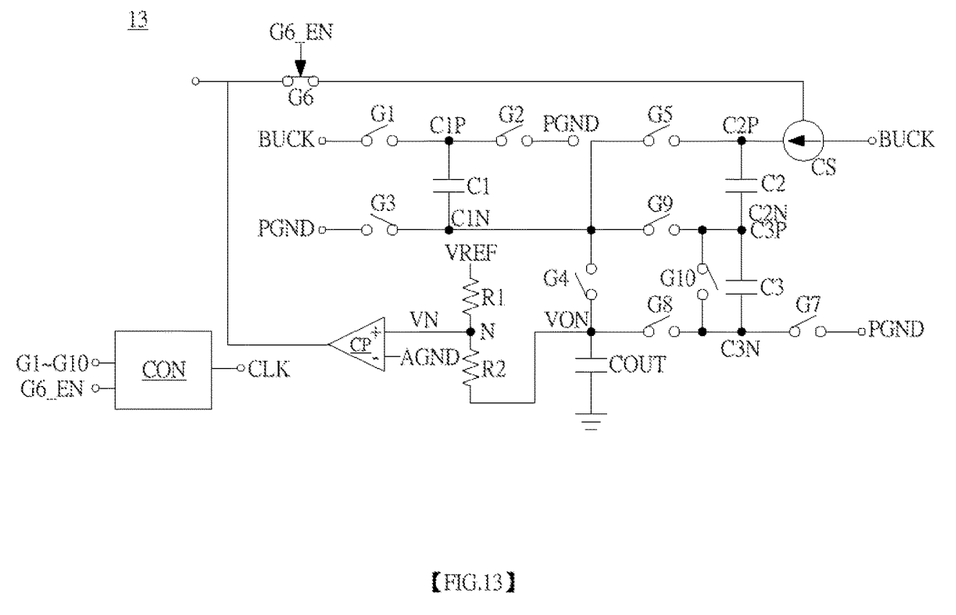

In another embodiment, as shown in FIG. 13, the output of the comparator CP is coupled to the sixth switch G6, and the sixth switch G6 is coupled to the current source CS disposed between the first voltage BUCK and the fifth switch G5. The charge pump 13 can not only control the operation of the first switch G1 to the tenth switch G10 according to the clock signal CLK through the control circuit CON, but also output the enable signal G6_EN to the sixth switch G6 through the control circuit CON to achieve the effect of regulating the negative output voltage VON within a range of −1 to −2 times by adjusting the voltage or current of the sixth switch G6.

It should be noted that the charge pump 13 can also adjust the voltage or current of the first switch G1 and the sixth switch G6 simultaneously to achieve the effect of regulating the negative output voltage VON within a range of −1 to −2 times.

Figure 14:
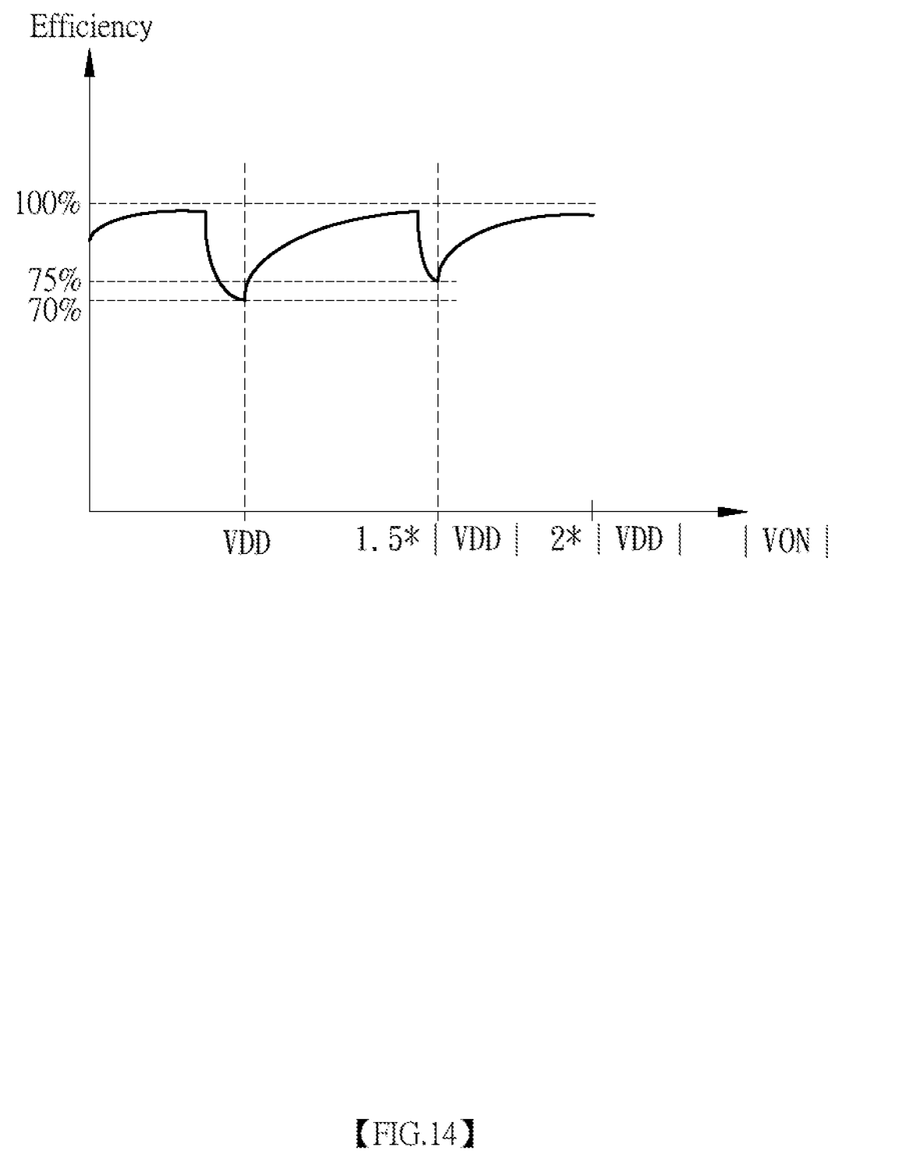
FIG. 14 illustrates a schematic diagram showing the charge transfer efficiency of the charge pump of the invention is significantly better than that of the conventional charge pump when the absolute value of the output voltage is close to the operating voltage.

Please refer to FIG. 14 and FIG. 4 simultaneously. When the absolute value |VON| of the output voltage (VON) is close to the operating voltage VDD, the charge transferring efficiency of the conventional charge pump 1 illustrated in FIG. 4 is only 50%. However, the charge transferring efficiency of the charge pump 5 of the invention illustrated in FIG. 14 can reach 70%.

Compared to the prior art, the charge pump applied to the OLED display panel of the invention can select an optimal charge pump switching way according to a negative output voltage of −1 times/−1.5 times/−2 times, thereby the charge transferring efficiency within negative output voltage of −1 to −2 times can be effectively improved.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A charge pump, applied to an OLED display panel and coupled to an output capacitor, comprising:
    a plurality of switches comprising a first switch, a second switch, a third switch, a fourth switch, a fifth switch, a sixth switch, a seventh switch, an eighth switch, a ninth switch and a tenth switch; and
    a plurality of capacitors comprising a first capacitor, a second capacitor and a third capacitor;
    wherein the first switch and the second switch are coupled in series between a first voltage and a second voltage, and the first voltage is higher than the second voltage; a first terminal of the first capacitor is located between the first switch and the second switch; the third switch is coupled between a second terminal of the first capacitor and the second voltage; the fourth switch is coupled between the second terminal of the first capacitor and the output capacitor; the fifth switch and the sixth switch are coupled in series between the second terminal of the first capacitor and the first voltage; the seventh switch and the eighth switch are coupled in series between the second voltage and an output voltage; a first terminal of the second capacitor is located between the fifth switch and the sixth switch; the ninth switch is coupled between the second terminal of the first capacitor and a second terminal of the second capacitor; the tenth switch is coupled between the second terminal of the second capacitor and the output voltage; a first terminal of the third capacitor is coupled to the second terminal of the second capacitor; a second terminal of the third capacitor is coupled between the seventh switch and the eighth switch; the charge pump is operated in a first phase, a second-A phase, the first phase and a second-B phase in order to provide the output voltage which is negative.

2. The charge pump of claim 1, wherein the first phase is a charging state, the second-A phase is a first charge transferring state and the second-B phase is a second charge transferring state.

3. The charge pump of claim 1, wherein when the charge pump is operated in the first phase, the first switch, the third switch, the sixth switch and the seventh switch are turned on and the second switch, the fourth switch, the fifth switch, the eighth switch, the ninth switch and the tenth switch are turned off, so that the first capacitor is charged by the first voltage and the second capacitor and the third capacitor coupled in series are also charged by the first voltage.

4. The charge pump of claim 1, wherein when the charge pump is operated in the second-A phase, the second switch, the fifth switch and the tenth switch are turned on and the first switch, the third switch, the fourth switch, the sixth switch, the seventh switch, the eighth switch and the ninth switch are turned off, so that the first capacitor and the second capacitor are coupled in series between a ground terminal and the output capacitor to generate the output voltage which is negative.

5. The charge pump of claim 4, wherein an absolute value of the output voltage is equal to a voltage of the first capacitor plus a voltage of the second capacitor.

6. The charge pump of claim 1, wherein when the charge pump is operated in the second-B phase, the second switch, the eighth switch and the ninth switch are turned on and the first switch, the third switch, the fourth switch, the fifth switch, the sixth switch, the seventh switch and the tenth switch are turned off, so that the first capacitor and the third capacitor are coupled in series between a ground terminal and the output capacitor to generate the output voltage which is negative.

7. The charge pump of claim 6, wherein an absolute value of the output voltage is equal to a voltage of the first capacitor plus a voltage of the third capacitor.

8. The charge pump of claim 1, further comprising:
    a control circuit, coupled to the plurality of switches respectively, for controlling operation of the plurality of switches according to a timing signal to operate the charge pump in the first phase, the second-A phase and the second-B phase.

* * * * *